United States Patent
Desmond

(10) Patent No.: US 7,567,854 B2
(45) Date of Patent: Jul. 28, 2009

(54) SELF STRUCTURING AND COMPUTING SYSTEM

(76) Inventor: Neil Desmond, 14992 Alaska Rd., Woodbridge, VA (US) 22191

( * ) Notice: Subject to any disclaimer, the term of this patent is extended or adjusted under 35 U.S.C. 154(b) by 461 days.

(21) Appl. No.: 11/219,712

(22) Filed: Sep. 7, 2005

(65) Prior Publication Data
US 2006/0095159 A1 May 4, 2006

Related U.S. Application Data

(63) Continuation-in-part of application No. 10/975,405, filed on Oct. 29, 2004, now Pat. No. 7,444,205.

(51) Int. Cl.
*G06F 19/00* (2006.01)
(52) U.S. Cl. .......................... 700/245; 901/1
(58) Field of Classification Search ................ 700/900, 700/249, 248; 318/568.2, 568.19, 575; 439/24, 439/27, 31, 39, 151, 299, 368, 620.21, 789; 901/28, 50; 977/725, 940, 963; 385/57, 385/67; 417/338, 467; 273/156, 160, 238, 273/239, 267, 276, 282.1, 289; 403/217, 403/219, 220, 361, 401, 402; 446/105, 108, 446/112, 114, 115, 116, 118, 120, 121, 122, 446/124, 125, 76, 77, 85, 901, 91
See application file for complete search history.

(56) References Cited

U.S. PATENT DOCUMENTS

| | | | | |
|---|---|---|---|---|
| 3,384,424 A | * | 5/1968 | Raines | 403/291 |
| 3,452,989 A | * | 7/1969 | Jernstrom | 273/276 |
| 3,550,630 A | * | 12/1970 | Panissidi | 137/624.18 |
| 4,109,398 A | | 8/1978 | Hida | |
| 4,516,476 A | * | 5/1985 | Beaton | 92/59 |
| 4,608,525 A | | 8/1986 | Mori et al. | |
| 4,697,472 A | | 10/1987 | Hiyane | |
| 4,964,062 A | | 10/1990 | Ubhayakar et al. | |
| 5,000,713 A | * | 3/1991 | Cheng | 446/120 |
| 5,040,626 A | | 8/1991 | Paynter | |
| 5,098,328 A | * | 3/1992 | Beerens | 446/128 |
| 5,103,403 A | | 4/1992 | Ch'Hayder et al. | |

(Continued)

OTHER PUBLICATIONS

Toth-Fejel, "Agents, Assemblers, and ANTS Scheduling Assembly with Market and Biological Software Mechanisms", http://www.foresight.org/Conferences/MNT7/Papers/Toth-Fejel/, 2003.

(Continued)

*Primary Examiner*—Khoi Tran
*Assistant Examiner*—Nicholas Kiswanto
(74) *Attorney, Agent, or Firm*—Diederiks & Whitelaw PLC

(57) ABSTRACT

A modular self structuring and computing system includes a matrix formed of a plurality of modules. Each module comprises up to six connecting assemblies that are detachably coupled to one another through pin and hole type connections to form a housing for a power source. Each connecting assembly includes a pivotally mounted leg with a connecting plate attached thereto and a central connector. The power source located at the center of the module communicates with each of the central connectors. Various modules in a matrix can be directed to move or pivot their legs to move or change the overall structure of the matrix or to conduct a task, such as replacing the power source of a module.

12 Claims, 13 Drawing Sheets

U.S. PATENT DOCUMENTS

| | | | |
|---|---|---|---|
| 5,142,932 A | 9/1992 | Moya et al. | |
| 5,145,130 A | 9/1992 | Purves | |
| 5,241,875 A | 9/1993 | Kochanneck | |
| 5,361,186 A | 11/1994 | Tanie et al. | |
| 5,435,405 A | 7/1995 | Schempf et al. | |
| 5,452,199 A | 9/1995 | Murata | |
| 5,515,934 A | 5/1996 | Davis | |
| 5,523,662 A | 6/1996 | Goldenberg et al. | |
| 5,662,587 A | 9/1997 | Grundfest et al. | |
| 5,664,387 A * | 9/1997 | Bhatti | 52/604 |
| 5,672,924 A | 9/1997 | Wallace et al. | |
| 5,746,038 A * | 5/1998 | Houk | 52/590.1 |
| 5,764,518 A | 6/1998 | Collins | |
| 5,799,943 A * | 9/1998 | Morgan | 273/272 |
| 5,924,906 A * | 7/1999 | Grafton | 446/121 |
| 5,988,845 A | 11/1999 | Murata | |
| 6,062,937 A * | 5/2000 | Kikuchi | 446/91 |
| 6,075,924 A | 6/2000 | Will | |
| 6,084,373 A | 7/2000 | Goldenberg et al. | |
| 6,095,011 A | 8/2000 | Brogårdh | |
| 6,150,738 A | 11/2000 | Yim | |
| 6,157,872 A * | 12/2000 | Michael | 700/247 |
| 6,233,502 B1 | 5/2001 | Yim | |
| 6,233,503 B1 * | 5/2001 | Yim et al. | 700/245 |
| 6,243,622 B1 | 6/2001 | Yim et al. | |
| 6,341,614 B1 | 1/2002 | Tucker et al. | |
| 6,546,315 B1 | 4/2003 | Michael | |
| 6,568,869 B1 | 5/2003 | Murata | |
| 6,575,802 B2 | 6/2003 | Yin et al. | |
| 6,605,914 B2 * | 8/2003 | Yim et al. | 318/568.11 |
| 6,636,781 B1 * | 10/2003 | Shen et al. | 700/248 |
| 6,686,717 B2 * | 2/2004 | Khairallah | 318/568.11 |
| 6,725,128 B2 * | 4/2004 | Hogg et al. | 700/245 |
| 6,749,480 B1 * | 6/2004 | Hunts | 446/92 |
| 6,786,896 B1 | 9/2004 | Madhani et al. | |
| 7,255,624 B2 * | 8/2007 | Daftari | 446/92 |
| 2003/0040250 A1 | 2/2003 | Yim et al. | |
| 2003/0097203 A1 | 5/2003 | Michael | |
| 2004/0103738 A1 | 6/2004 | Gao et al. | |

OTHER PUBLICATIONS

Hall, "Utility Fog: The Stuff that Dreams are Made Of", http://discuss.foresight.org/~josh/Ufog.html, 2003.

Author Unknown, "Modular Reconfigurable", http://www2.parc.com/spl/projects/modrobots/, 2003.

* cited by examiner

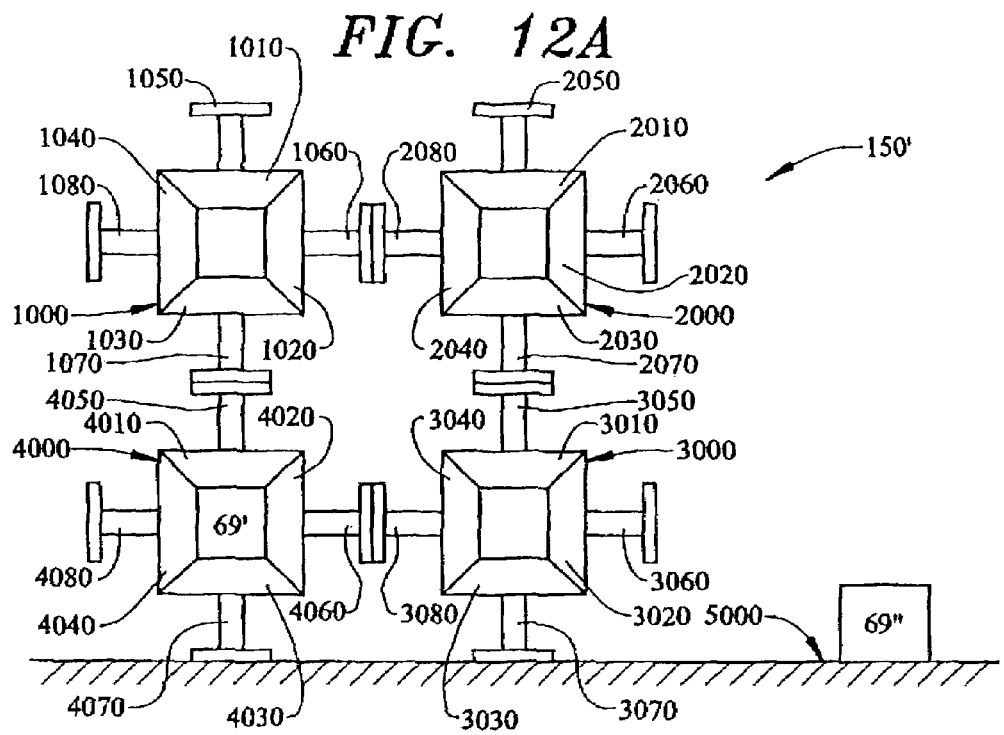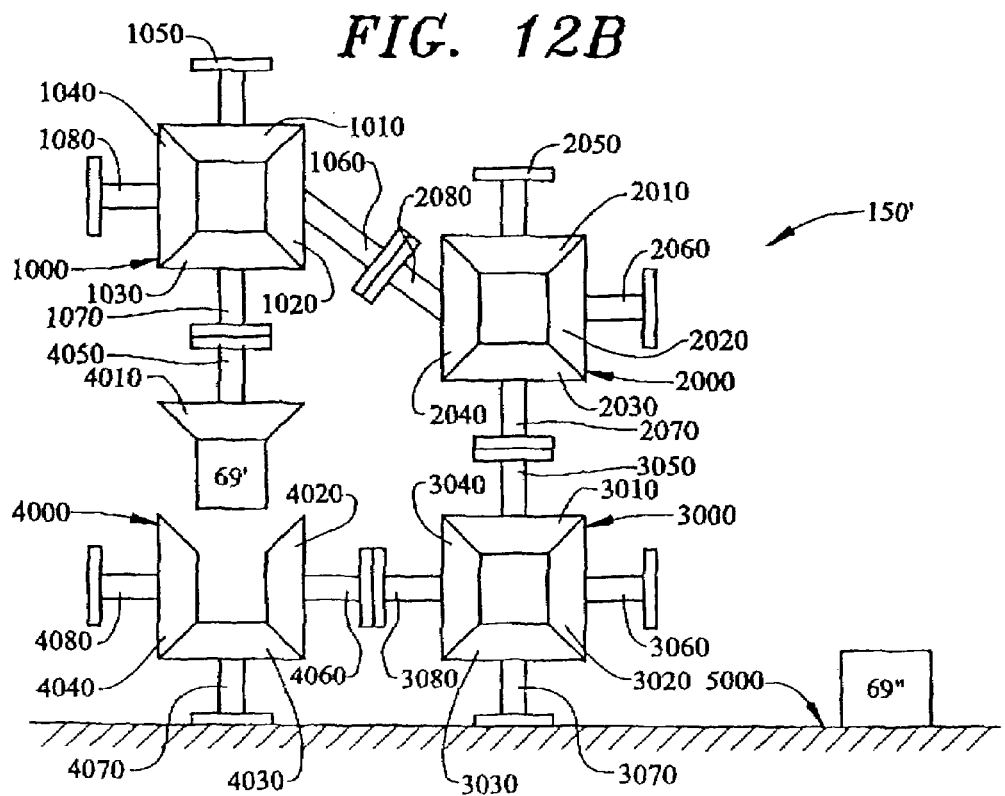

SELF STRUCTURING AND COMPUTING SYSTEM

CROSS-REFERENCE TO RELATED APPLICATIONS

The present application represents a continuation-in-part of U.S. patent application Ser. No. 10/975,405 filed on Oct. 29, 2004 now U.S. Pat. No. 7,444,205 and entitled "A Modular Self Structuring and Computing System."

BACKGROUND OF THE INVENTION

1. Field of the Invention

The present invention is generally directed to a self structuring and computing system. More particularly, the invention is directed to numerous modules that are each formed from detachably coupling six connecting assemblies together around a single power source. The modules can be fit together into a system by various connection devices and communications channels that allow the modules to move relative to one another to form themselves into desired objects or perform desired tasks.

2. Discussion of the Prior Art

Currently, in many diverse applications, fields or professions, mechanisms are formed to essentially do one dedicated task. Even those devices which may do multiple tasks are formed with a particular configuration and have very little adaptability to conduct other tasks or change their shape in any meaningful manner. For example, although a computer can be manufactured so that it has certain types of processors, ram, memory or hard drives and further may be programmed to do numerous different tasks, the computer structure itself is essentially static. In other words, if a memory chip needs to be replaced, the box or container for the computer must be opened, the old ram chip or hard drive must be removed and a new chip is placed in the computer.

The structure in typical non-computing devices is even more difficult to change once the devices are manufactured. Objects as simple as forks, knives or spoons or various equipment around the office, such as clipboards and paper clips or even personal use items, such as cameras, eyeglasses, earphones or amusement devices are all pretty much manufactured in their final form. At best, the most adaptable Swiss army knife may have numerous different blades but each blade is cast or manufactured in its final form and simply may be rotated to an operational or non-operational position. For example, the knife cannot become a fork and the fork cannot become a spoon, etc.

On a larger scale, such as, for example, at a manufacturing site, numerous different machines must be used, one for each task. A crane, a forklift and a dump truck all are separately manufactured, have very specific tasks they perform and are brought to a construction site when needed. Recently, some construction equipment has been provided with interchangeable tools. A backhoe may change the tool on its arm from a bucket to a drill, etc. However, even then a selection of different tools must be available.

The equipment on a fire truck provides a good example of how specific tools have become. When firemen on a fire truck arrive at the scene of an accident or fire, they must bring numerous different types of equipment, such as ladders or hoses, axes and the like so that they have the right tool for the right job. Clearly, a reduction in the amount of needed tools would be helpful. Furthermore, the vehicles themselves tend to be very specific. A police car is different from a fire truck which is different from an ambulance, etc. Once again, because once these devices have an essentially static configuration after they are manufactured, any desired modifications to the vehicle must be made in a factory or repair shop.

On a much smaller scale, various parts of tools, such as a knife or parts of a car, such as sensors, indicators, accelerators, brake pedals, transmissions, etc., are all statically formed. At best, for example, a seat in the car might be adjusted forward and back or folded to place the vehicle into a cargo-carrying configuration from a passenger-carrying configuration. However, no fundamental change to structure is designed into these devices.

Some solutions have been prepared to address these problems. For example, Utility Fog is a nanotechnology based idea wherein tiny robots form a layer of interrelated units that are connected to one another. The tiny robots can move relative to one another in order to change the shape of an object. For example, they can change the appearance of furniture so that one style of furniture becomes another style. However, currently, Utility Fog falls short on details. For example, Utility Fog, as disclosed, does not have a particularly good mechanism for connecting the various robots or storing energy. Furthermore, manipulating the units relative to one another or developing an effective communication scheme that allows the units to talk to one another has not been developed.

U.S. Pat. No. 5,988,845 discloses a universal unit for automatically configuring three-dimensional structures to desired shapes. This patent is generally directed to three-dimensional structures which may be formed by grouping large numbers of three-dimensional universal units. While this patent does disclose more details regarding the transmission of power from one unit to another and a connecting mechanism, once again, the way these units are connected and move relative to one another are particularly cumbersome and inefficient.

Finally, U.S. Pat. No. 4,608,525 discloses a cellular type robot apparatus. The robot cells are coordinated so that each cell can be controlled so as to operate in concert with one another. Once again, this patent does not disclose a particularly efficient manner of connecting these units or moving them relative to one another.

Regardless of these solutions, we can see that there exists a need in the art for a self-structuring modular system which has an efficient manner of connecting the sub units (or modules), providing communication and computing power and allowing the elements to move quickly and rapidly from one position to another relative to each other.

SUMMARY OF THE INVENTION

The present invention is directed to a modular self structuring and computing system including a matrix formed of a plurality of modules. Each module comprises up to six connecting assemblies that are detachably coupled to one another through pin and hole type connections. Each of the connecting assemblies includes a central connector that can communicate with a power source located in the center of the module and a movable leg with a connecting plate. Typically, each leg of a module may pivot about two axes and can be extended away from and retracted towards the module housing. Various types of actuators may be used to pivot, extend and retract the legs. A small amount of memory can be located within the module or within each set of module legs. Additionally, the connecting plates are rotatable so as to engage one another. Communication systems are provided between the connecting plates so that one module may connect and thus communicate with another module. In order to have the computing system understand its orientation, each side of the housing of the six sides is numbered and identified.

Groups of modules may be formed into a matrix type structure and by directing various modules to move or pivot their legs, the overall structure can move to change its shape and/or size, or perform various tasks. Additionally, modules may move from spot to spot by connecting and disconnecting legs in an orderly fashion. For example, a single module at a time may be moved from one end of the overall matrix to another, thus moving the overall matrix in a slow and orderly fashion. Furthermore, one set of modules may be programmed to move relative to another set to cause linear or rotational motion. Alternatively, a plurality of modules may be added to a matrix and then moved to an appropriate position, resulting in a matrix that has a desired shape and size.

Power and computing for each module is also transmitted along with the communication. If one module loses power, other modules may divert power to that module from a different source. Finally, each module can have or be assigned a unique identification value or address, thus allowing a particular module to be given instructions for a desired task.

With this system, a matrix of modules may form any desired shape and perform any desired function. A matrix could start as a spoon and change into a fork. A fire truck would only have to carry one tool or none if the truck itself was formed from modules. In a construction site, a single machine formed of a matrix of modules could quickly adapt to perform numerous jobs at the site.

Additional objects, features and advantages of the present invention will become more readily apparent from the following detailed description of a preferred embodiment when taken in conjunction with the drawings wherein like reference numerals refer to corresponding parts in the several views.

BRIEF DESCRIPTION OF THE DRAWINGS

FIGS. 12A, 12B and 12C are a series of Figures showing how four modules cooperate to replace the power source of one of the modules.

DETAILED DESCRIPTION OF THE PREFERRED EMBODIMENTS

Figure 1:
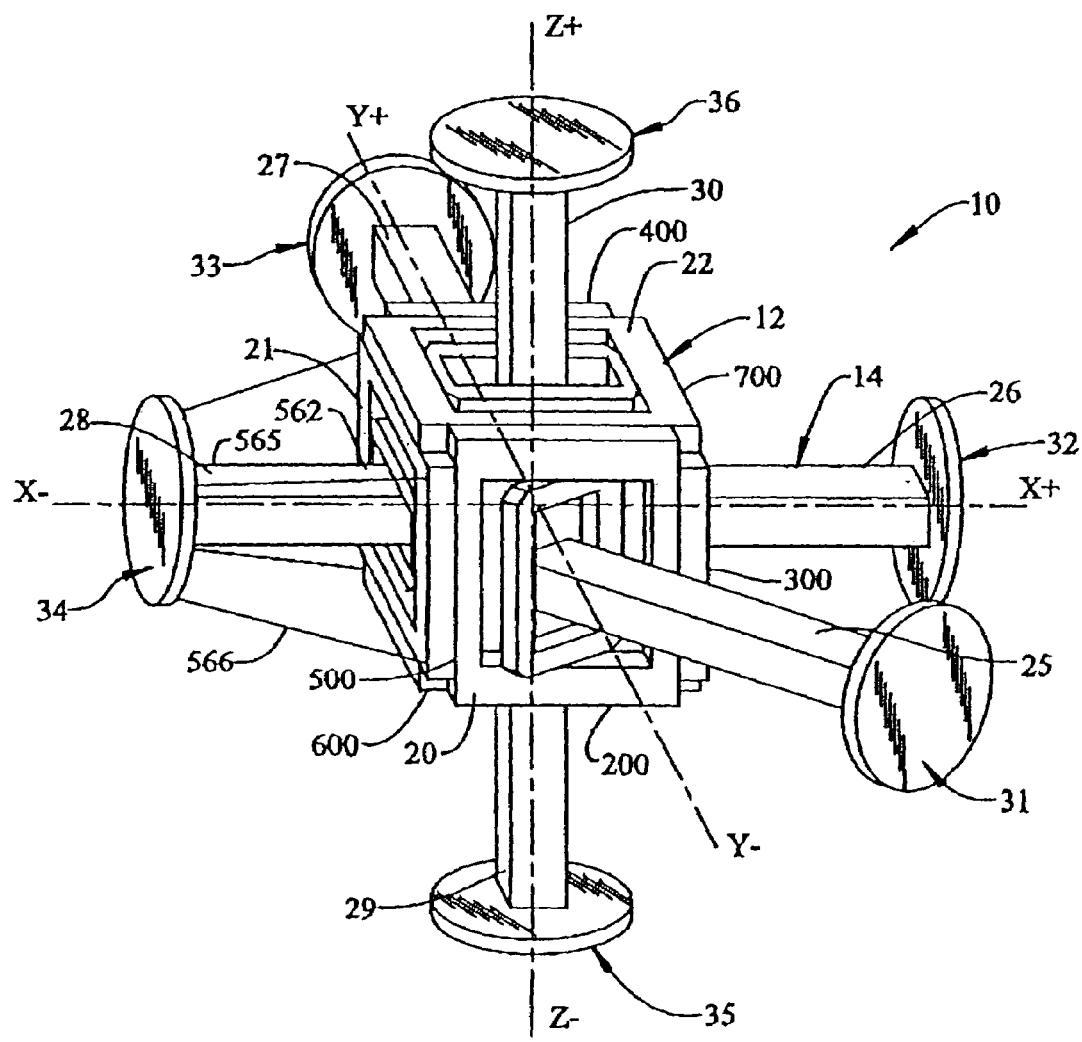
FIG. 1 is a perspective view of a six-sided module for use in a self-structuring and computing system.

With initial reference to FIG. 1, there is shown a single six-sided module 10 according to a preferred embodiment of the invention. Module 10 is preferably formed of two major components, a housing 12 and a set of legs 14. Housing 12 is shown as a cube but could be formed in other shapes, such as a sphere. Housing 12 comprises six connecting assemblies (200, 300, 400, 500, 600, and 700) which are detachably coupled to one another. In its cubic form, housing 12 has six faces. Only a front face 20, a left side face 21 and a top face 22 are shown. Each face provides a mounting area for a respective leg (25, 26, 27, 28, 29, 30) providing housing 12 with six legs. Legs 14 could also, if desired, be placed at each corner (not separately labeled) of housing 12 resulting in module 10 having eight legs. Legs 14 could also be placed both at each surface and each corner resulting in housing 12 having fourteen legs. Of course, any intermediate number of legs is also possible. In a preferred embodiment, housing 12 supports legs (25-30) in a pivotal manner. Each leg (25-30) is provided with a respective connecting plate 31-36. Module 10 is preferably symmetrical about all three axes and numerous modules 10 may be connected to each other by attaching respective connecting plates (31-36) to form a matrix. The lowermost modules 10 may use their connecting plates (31-36) as feet to support the matrix.

Figure 2:
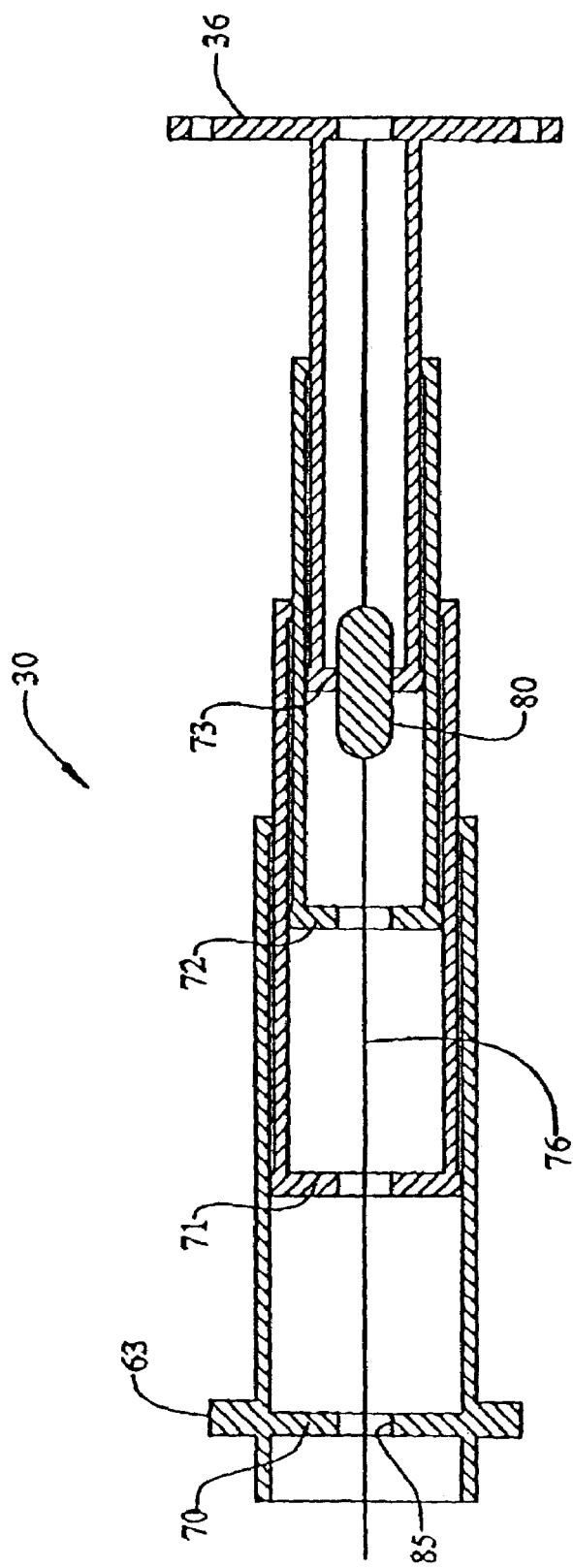
FIG. 2 shows a cross section of a leg along with the leg's internal power and communications cable.

Turning now to FIG. 2, numerous types of extendable beam structures may be used in each leg (25-30). For example, leg 30 includes mounting pins 63 for connecting leg 30 to housing 12 (shown in FIG. 1). A power source, such as a battery 69 (not shown in FIG. 2) may be utilized to move leg 30. In one embodiment, leg 30 includes a series of tubular members (70-73) that may be formed in a telescopic configuration. Of course, the tubular members (70-73) could be in the form of any type of hollow shape, such as a rectangular tube. A largest outer tube 70 includes mounting pins 63 at one end for connecting to housing 12, while a smallest inner tubular member 73 is connected to connecting plate 36. In use, only intermediate tube 71 would be moved in and out if the requirement to extend leg 30 is small and all the tubes (71-73) would be moved relative to one another if a full extension of leg 30 is required. In this manner, the strongest tubes 71 will be used most often and the smaller inner tubes 73 will be used least often.

In order to communicate between different modules, electrical and optical communications are provided between housing 12 and each connecting plate (31-36). For example, wires and optic fibers can be bundled into a cable 76 that may be extended or retracted as leg 30 is extended or retracted. To avoid having cable 76 pinched by sliding tubular members (70-73), cable 76 is protected by a pill type cable support 80. In this arrangement, innermost tubular member 73 of leg 30 is attached to connecting plate 36 at its outermost end and slidably mounted in the next largest tube 72. The next largest tube 71 is open at its outward end so as to receive tube 72. In a similar manner, several outer tubes of progressively larger size and analogous shape may be used, as demonstrated in FIG. 2 by tubular members 70-73. At its inner side, the next largest tube 70 is closed off except for a small central hole 85 for allowing passage of the cable 76. Cable support 80 is provided in the opening of the innermost tube 73. As the tubes 71, 72, 73 are retracted, the openings in each tube engage cable support 80 which is fixed to the end of innermost tube 73, thus preventing pinching of cable 76. In essence, cable support 80 guides cable 76 through each opening.

Figure 3:
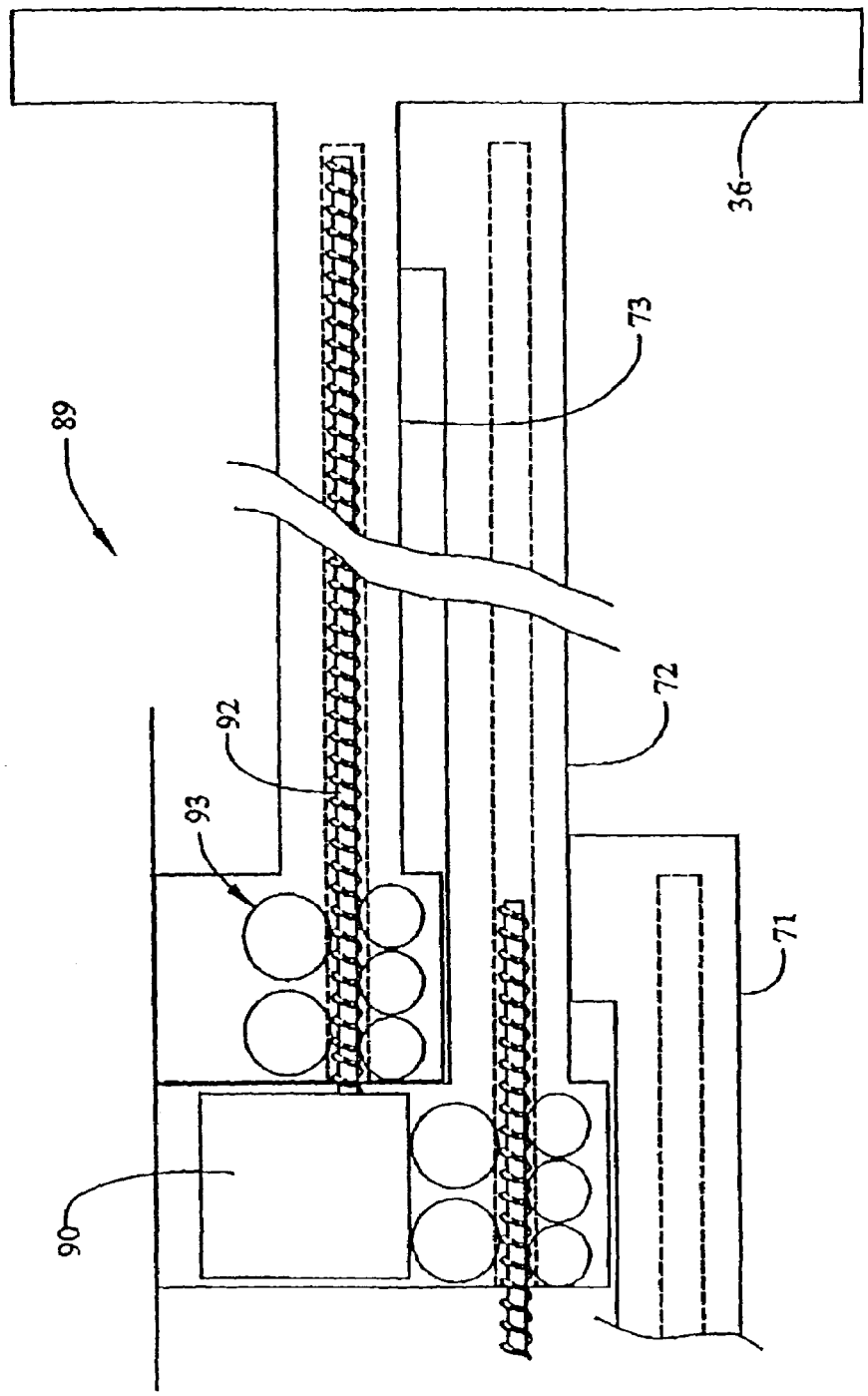
FIG. 3 depicts a drive mechanism for actuating one of the legs of the module in FIG. 1.

In a preferred embodiment shown in FIG. 3, the propulsion of the various tubes (71-73) is by a series of screw-nut actuators 89 driven by a series of motors 90 (only one of each shown). An inner set of motors 90 each drive a respective threaded shaft 92. A nut is formed to receive the shaft 92 so that when the shaft 92 rotates, tube 73 moves axially and thus the overall leg 30 extends. The nut may be a traditional, internally-thread member or may be formed from rotating gears 93. When gears 93 are present, they provide an override feature. In a traditional screw nut linear actuator, forcibly moving the linear threaded member will break the actuator. In the current design, when excessive force is placed on the threaded member 92, the gears 93 rotate, allowing compression of the overall leg 30. The force necessary to cause such an override situation may be adjusted as needed.

Several different additional types of linear actuators (not shown) may be used to extend and retract each leg. While a screw nut type of actuator is depicted in FIG. 3, it is envisioned that an alternative actuator in the form of a series of magnets placed along the length of the tubes (71-73) may be used. Electromagnets placed among the series of magnets could be controlled by a computing mechanism each or a central processing unit (depicted in FIG. 7). By selectively activating certain magnets, the amount of distance the tubes (71-73) move relative to one another is controlled. Any inexpensive and efficient power source can be utilized, such as battery 69 (depicted in FIG. 7). Power is then transmitted from the actuator to leg 30 by a variety of mechanisms. A so-called "lazy tong" mechanism or folding lattice, such as that found in a child safety gate, may also be used. One end of a folding lattice may be attached to the pivoting base tube 70 of the leg 30 and the other end attached to the connecting plate 36. As the first set of scissor legs are brought together by the actuators mounted in the leg base tube 70, the entire lattice structure extends, thus extending the leg 30. This expanding lattice would be placed within the telescoping tubular members (70-73) described above. Another arrangement could include a series of cone shaped members having openings at each end. The cones would be placed in a nested configuration. The cones would include longitudinal openings, which allow a cable to be threaded through. As the cable is pulled taut, the cones are forced to extend. Telescoping tube (70-73), such as that discussed above, could be placed around the cones to provide additional stability. An electric actuator directly built into the telescoping tubes (71-73) could also be used.

The actuators for pivoting the legs (25-30) will have to be powerful to provide enough force to move the matrix. Also, they will have enough force to hold the legs (25-30) at a desired angle once the leg (25-30) has been pivoted. Preferably, a neutral position is also provided for the legs (25-30) so that they may pivot freely as necessary. A preferred mechanism for use as such an actuator is a high speed electric motor having a worm gear on its drive shaft. A brake is also provided to stop the motor. The worm gear is connected to a large gear connected to a small circular gear and a small gear drives a rack to provide for translational movement. As such motors and gears are well known in the art, they will not be discussed in detail here.

Figure 4A:
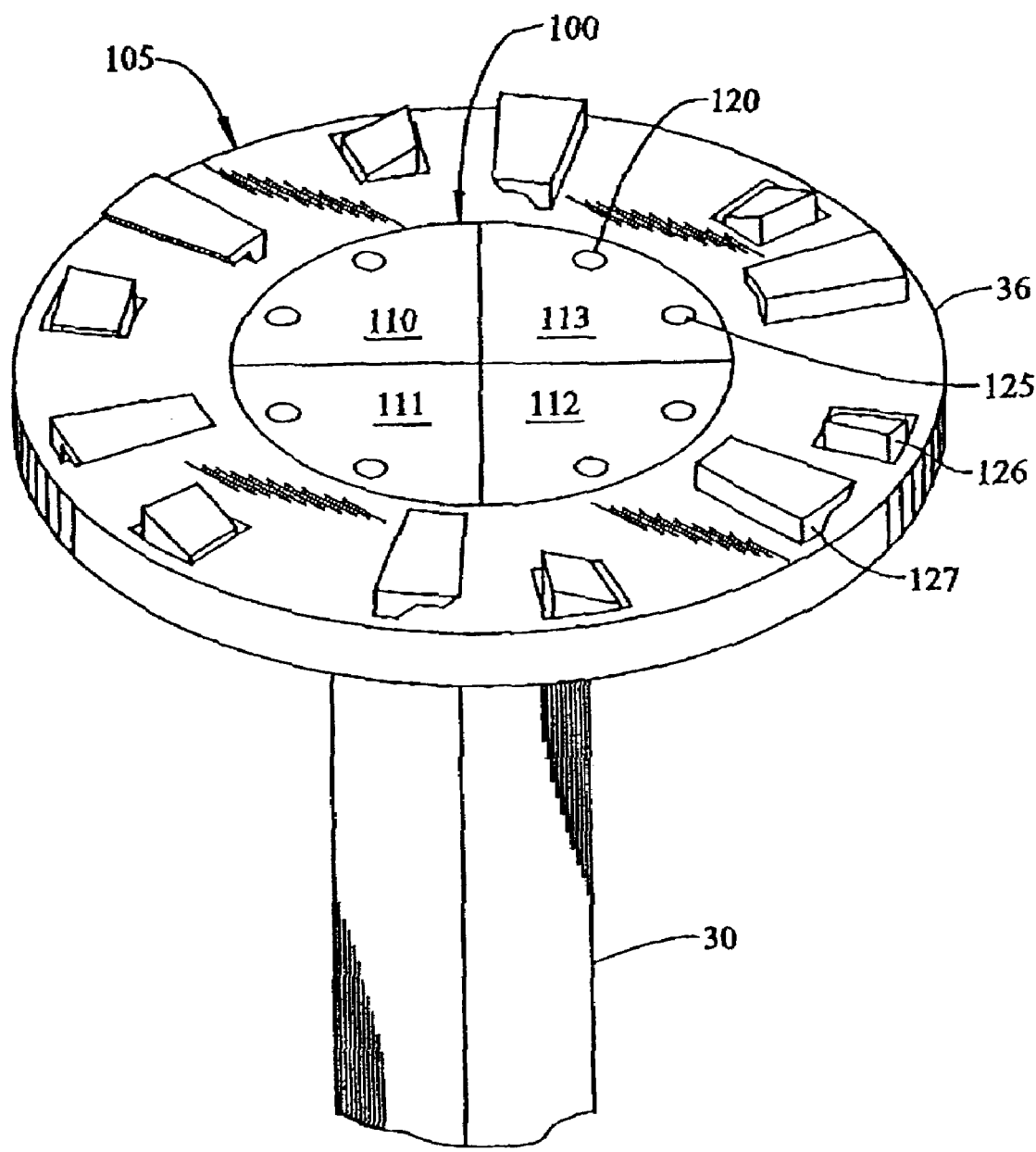
FIG. 4A shows a connecting plate of one of the legs of the module shown in FIG. 1 according to a first preferred embodiment of the invention.

Turning now to FIG. 4A, the connecting plates (31-36) may be of several designs to provide communication and power transfer between several modules 10. For example, connecting plate 36 is generally divided into a central area 100 and an outer area 105 that may rotate independently if desired. Central area 100 may be subdivided into four sectors 110-113, with each sector having a power connection 120 and a communications channel 125. The use of four sets of power connections 120 and communication channels 125 allows for redundancy so that if one channel fails the others may take over. With reference to FIGS. 1, 2 and 4A, cables 76 are connected to housing 12 at one end and connected to connecting plate 36 at the other end to provide communication between housing 12 and power connection 120 and communication channel 125. In the case of a fixed cable connection between cable 76 and connecting plate 36, the connecting plate 36 may only rotate a limited amount relative to its tubular support member 70 in order to prevent excess torque of cables 76. Of course, if cables 76 communicate with connecting plate 36 through electrical contact pin connections rather than through a fixed connection, the connecting plate 36 may rotate indefinitely. Connecting plate 36 includes plungers 126 and hooks 127 for providing a relatively long-term mechanical connection between connecting plates as discussed in more detail below in regard to FIGS. 5A-5C.

Figure 4B:
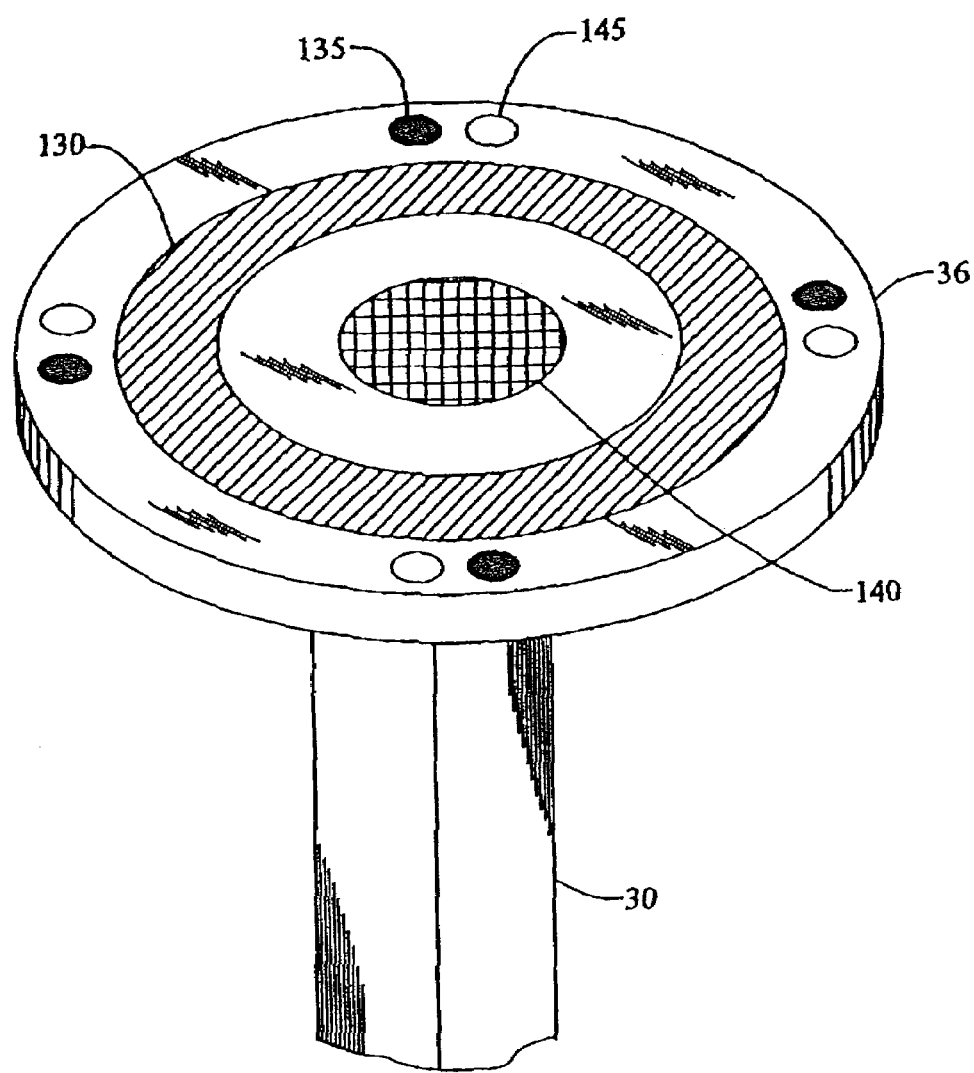
FIG. 4B shows a connecting plate of one of the legs of the module according to a second preferred embodiment of the invention.

FIG. 4B shows an alternative connection method in which connecting plate 36 is capable of connecting to other module connecting plates using either an electromagnet 130 or connecting clamps and pins 135 and 145, for long-term or short-term connections. Additionally, electromagnets 130 could be used to send and receive signals and to transfer power through coupled mutual inductance. In the case that electromagnets 130 transmit signals and power, then a communications region 140 and power conduits may be omitted from connecting surface 36. Although FIG. 4B depicts the electromagnetic connection in conjunction with mechanical connecting pins 135, it is understood that the various mechanical connection methods can be used interchangeably with various communications methods.

Figure 5A:
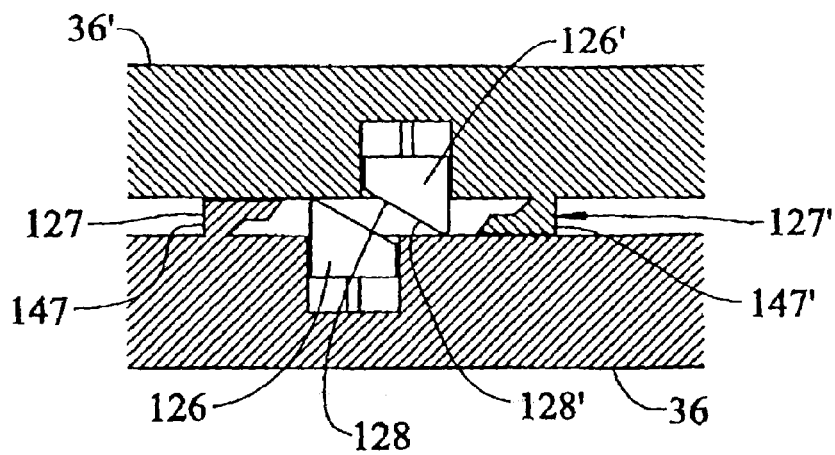
FIGS. 5A, 5B and 5C are a series of Figures showing how two different connecting plates engage one another.
Figure 5B:
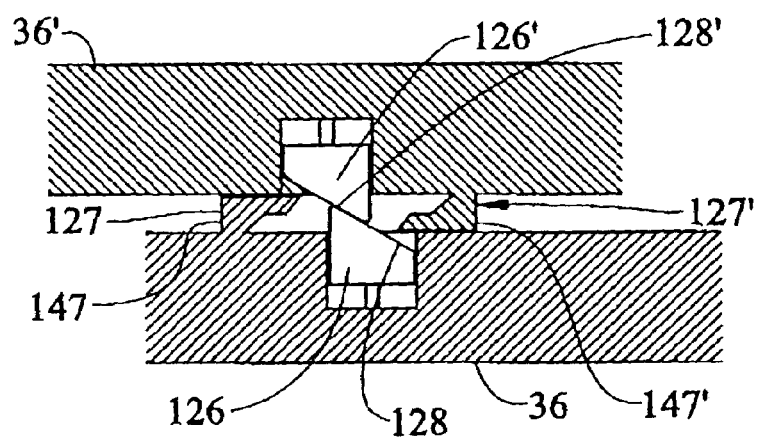
Figure 5C:
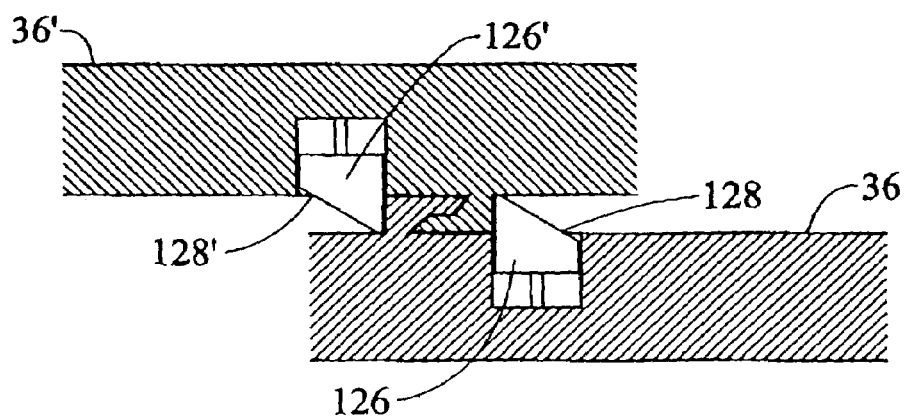

The manner in which the plunger 126 and hook 127 mechanical connection of FIG. 4A engages is depicted in FIGS. 5A-5C. As hooks 127, 127' are rotated into engagement, plungers 126, 126' retract due to the action of their cooperating sloped top faces 128, 128'. As hooks 127, 127' pass plungers 126, 126' plungers 126, 126' extend and engage the backs 147, 147' of hooks 127, 127' locking them in place. The connection can be broken by retracting the plungers 126, 126' and rotating connecting plate 36 in a reverse direction versus connecting plate 36'. Alternate connection mechanisms may also be used. In any case, a releasable strong connection is all that is desired. Connecting plate 36 may rotate relative to leg 30 by use of a motor. As with the pivoting connection of leg 30 described above, connecting plate 36 should be fixable at a certain position or be allowed to rotate freely as desired.

Figure 6:
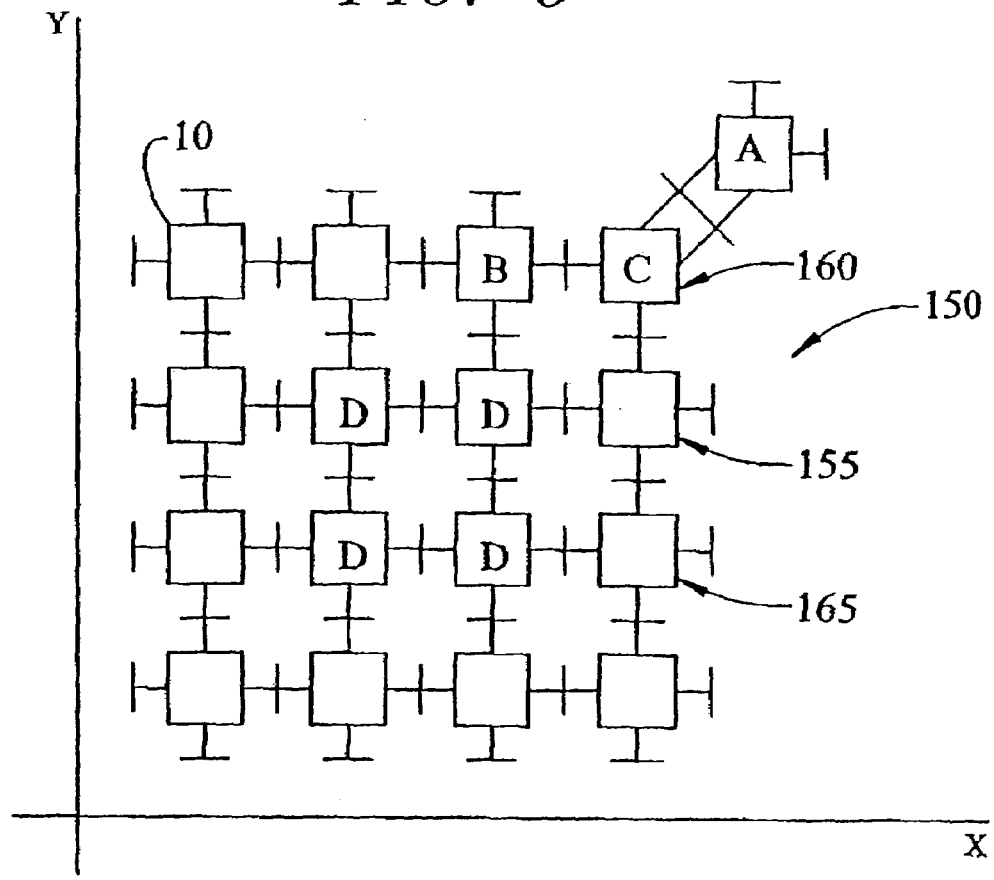
FIG. 6 shows multiple modules of a preferred embodiment attached to one another in a matrix.

In operation, as shown in FIG. 6, large groups of modules 10 are assembled together by joining of their connecting plates 31-36 as discussed above. Once a group of modules is joined into a matrix 150, several options are available as to how the modules will move relative to one another. For example, in 2-dimensional matrix 150, the central row 155 of modules may move as a group relative to the outer rows of 160, 165 modules. Central row 155 can then be used to push or pull levers or lift or lower things. If the group moves both in translation and in rotation, the group may act as a leg for overall matrix 150 and provide a way for overall matrix 150 to move. By extension, if various groups are moved and pivoted, an arm and hand (not shown) may be formed which will be able to manipulate objects so that they may be inserted or placed where desired. Additionally, numerous modules 10 may be added to the matrix 150 to increase its overall size.

In addition to moving groups of modules relative to one another, single modules 10 or groups of modules may change position relative to one another to change the overall shape of matrix 150. For example, as seen in FIG. 6, a module A may move from being attached to a module B to being attached to a module C. This motion may be achieved by spinning module A as it moves from B to C. Module A can also move around a corner of matrix 150 by continuing its rotation and connecting another connecting plate of module C before proceeding down the side of matrix 150. In a similar manner, module A may move along a string of other modules.

One could imagine a building being built by millions of such modules climbing the side of a column and placing themselves at the top of the column to allow yet another layer of modules to climb the side of the column to place a next layer. If the weight of the column is slight, or in the case of a row of modules, a new module can simply replace the position of the first module in the column or row, thus shifting the row or column over one space. This movement achieves the same final configuration more quickly since all the modules are interchangeable.

Rotational motion can also be caused on a large scale. For example, a series of four internal modules D surrounded by a square of twelve modules (not separately labeled) can be used to create such a rotation. Note the modules 10 shown in FIG. 6. The four internal modules D can walk around the inner surface of the outer square thus causing the internal modules D to rotate relative to the outer group. Larger groups of modules could achieve similar motion, wherein for example, a group of nine modules could rotate within a group of fourteen. With even larger groups, the inner groups could be shaped to approximate a circle and the outer groups could be shaped as a ring.

Simply extending or retracting the length of each leg in each module can also accomplish expansion and contraction of an overall matrix 150. Such motion is accomplished without the need for adding or subtracting modules to matrix 150 and may be done in an extremely quick manner. Likewise, if one wishes to expand matrix 150 in only one direction, only legs parallel to that direction would be extended. It is envisioned that numerous combinations or expanding and rotating of strategic parts of matrix 150 would give rise to extremely complicated motions in the overall matrix 150.

Figure 7:
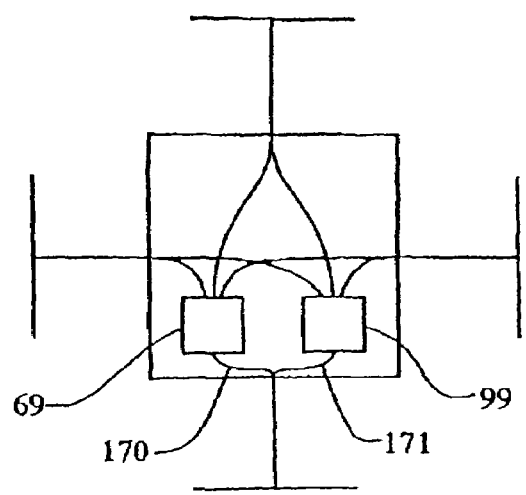
FIG. 7 shows an enlarged view of a module shown in FIG. 6.

The power systems of the matrix 150, as with all systems, begin with a single module 10. As shown in FIG. 7, each module 10 preferably includes at least one battery 69 or other similar power source and at least one central processing unit 99. Wiring 170 is provided so that power source 69 may communicate with all six connecting plates and thus connect to every other module in the matrix 150. In a similar manner, the central processing unit 99 is also connected with wiring 171 to every connecting plate of the module 10, thus connecting the central processing unit 99 to every other processing unit in matrix 150. Each module can have a small amount of memory (e.g. 100 kilobytes). Alternatively, each set of legs in a module can contain its own small memory source. Every module is designed to have its own individual power supply; however, should one power supply fail, the module with a failed power supply may draw power from adjacent modules. Further, some modules may have their power source removed and still function using power from adjacent modules. Power may also be relayed through a series of modules. Such modules can also act as an electrical power transmission line. Although depicted in FIG. 7 as off-center, preferably battery 69 is housed within a central portion of module 10 as will be discussed in more detail below.

Referring back to FIG. 1, communication between each housing starts with each housing identifying its orientation. There are two ways a module or set of legs can obtain an address: 1) explicitly, wherein the module or leg set stores an identification (ID) value or, 2) implicitly, wherein the collective matrix utilizes techniques such as an algorithm involving having each module relay a data packet and subtracting one from a destination counter. In a first example, the address is explicit and each module has a unique ID value. The value can be fixed and pre-assigned when the module is manufactured. An ID number can also be assigned to each set of legs on a module. A portion of the memory (whether in the core of the module or in the legs) can be used to store the ID number. The ID number can be absolute or relative. An algorithm can be used to extrapolate the address of a particular module using a combination of ID values from several modules in a matrix.

As discussed above, housing 12 can be represented as a cube having six sides. Each side is assigned a number. For example, each even number may be opposite the odd number that proceeds it. So, 2 is opposite 1; 4 is opposite 3 and 6 is opposite 5. Furthermore, the odd numbers are grouped around one corner, the even numbers are grouped around an opposite corner and the even numbers are arranged in an ascending order in a clockwise direction. So, for example, front face 20 may be assigned 1; left side face 21 may be assigned 2, etc. The arrangement of the numbers could also be that of standard left or right-handed dice in which opposite sides add up to seven. The numbers may be pre-assigned or may be assigned when two connecting assemblies (200, 300, 400, 500, 600, 700) are joined based on the pattern. As two connecting assemblies are engaged, their relative orientation can be used to determine which number is assigned to each side of each face of the module. Using a standardized or uniform pattern conserves system resources, as compared to, for example, having to utilize a random number generator for producing a new pattern every time assemblies band together to form a new module.

In order to arrange a matrix 150, an implicit address method is utilized. Once matrix 150 is formed, the location of each module 10 is assigned an address or value. Instructions for a certain module can be sent to the address of the module. Indeed if a module fails, it can be replaced and the new module can take the failed module's position and address, thus causing minimal disruption by the replacement. The location of each module can be stored as a binary number. For simplicity sake, a three bit number will be used as an example. It should be understood that much larger numbers may be used for large matrixes. The addresses may be pre-assigned and stored in memory or they may be assigned by an algorithm.

Once the addresses are assigned, there are a number of ways that data may be transmitted. In a linear array, a packet of data may include the final address assigned to a counter and subtract one from the counter as it travels to each module. When the packet's counter value equals zero, the packet has arrived at its destination location. For example, a data packet could have a destination address of 011. Since the counter value is not 0, the data packet will move on, subtracting one from the counter, thus having a new counter value of 010. This process is repeated until the data packet has arrived at its destination which is determined by the counter value equaling zero. This system is particularly advantageous in that each module does not need to know its own address. For larger groups, the matrix can be divided into sets of eight with each set being labeled. If data wanted to go to the $3^{rd}$ module in the $5^{th}$ set, an address 5-011 or 101011 in binary could be used and assigned to the counter.

In a two-dimensional array, the address would be given in both directions such that each address would have a six-digit binary-number for each direction. Likewise, in a three-dimensional matrix, three six-digit binary-numbers would be used for a cube having up to 262,144 modules. Of course, in two and three-dimensional matrixes, finding the quickest path to a destination module becomes important. In a two-dimensional array, directions can be added to the data packets so that it knows not only the final destination but also a particular path to travel. For example, value 000 could mean "stop," 010 could mean up, 011 could mean down and 100 could mean left, etc. Such directions could be relative to the data packet's direction of travel or could be absolute compared to the overall matrix orientation. The shortest path can be calculated using optimization algorithms and then transferred to the data packet. In the case of larger and larger matrixes, the larger address identifying designators may be used.

FIGS. 8-11 will now be referenced for the manner in which connecting assemblies 200, 400, 500, 600 and 700 with respective legs 25, 27, 28, 29, and 30 can detachably couple to one another such that they each communicate with battery 69. In order to aid in the understanding of the present invention, it should be understood that corresponding numbers are used for like parts on each of the connecting assemblies (200, 300, 400, 500, 600 and 700). For example, connecting assembly 200 has a back wall 247, while connecting assembly 300 has a back wall 347, connecting assembly 400 has a back wall 447, etc.

Figure 8:
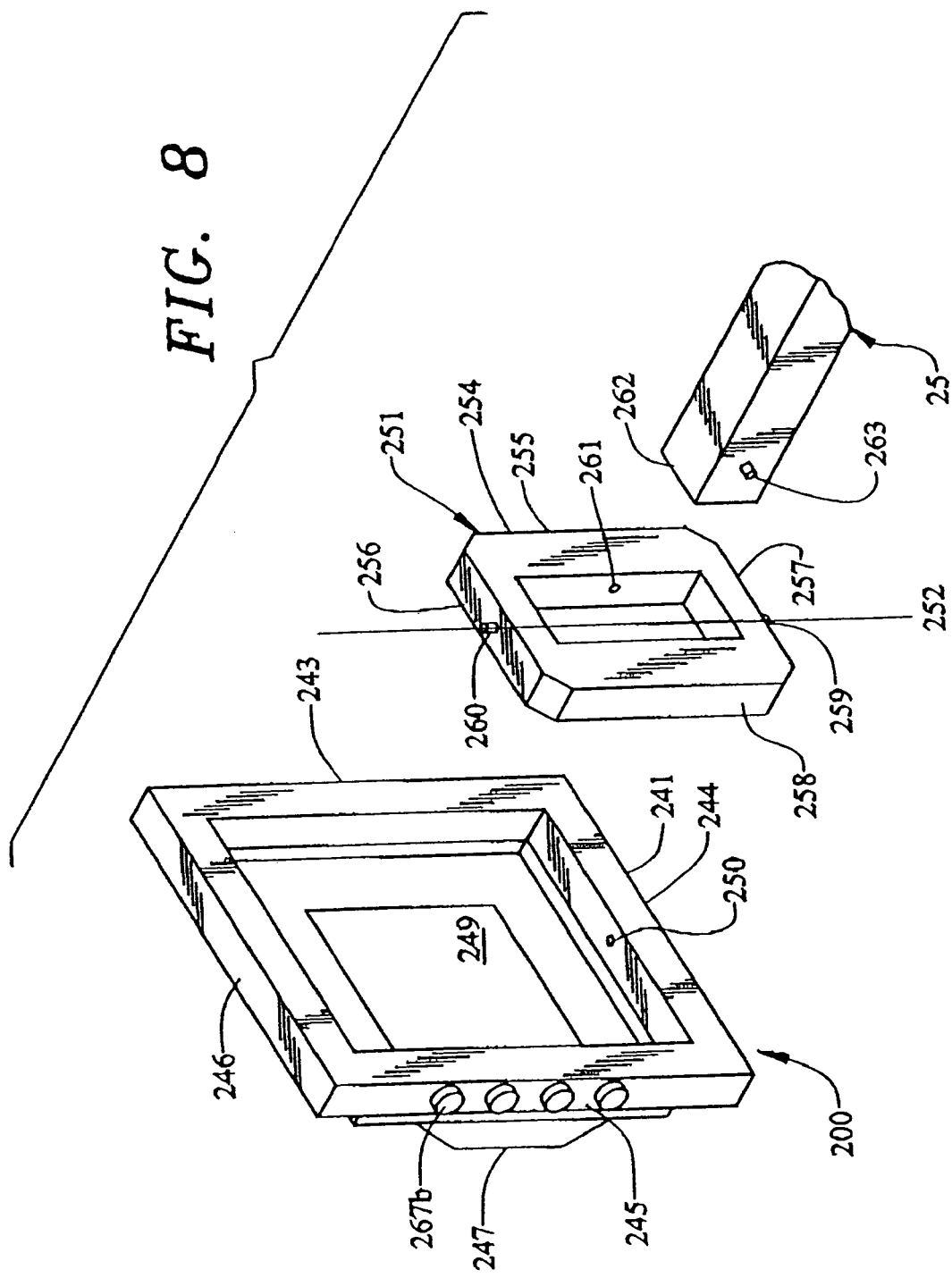
FIG. 8 is an exploded detail view showing a leg an associated connecting assembly according to FIG. 1.

Turning now to FIG. 8, there is illustrated an exploded view of leg 25 and its associated connecting assembly 200. A typical leg, such as leg 25, may pivot in any direction relative to housing 12 (shown in FIG. 1) due to connecting assembly 200. A rectangular frame 241 is mounted securely in connecting assembly 200. Frame 241 includes four beams (243-246) and back wall 247 which define the boundaries of a centrally located recess 249. Oppositely located beams 244 and 246 have mounting holes 250 (only one shown) located symmetrically opposite one another. Back wall 247 and frame 241 form recess 249 in which a pivoting assembly 251 is mounted for rotation about a first axis 252. Pivoting assembly 251 includes a rectangular housing 254 formed of four beams (255-258). Two of the beams (256,257) have outwardly extending pins 259, 260 that generally cooperate with mounting holes 250 in frame 241 to allow for the pivoting motion of pivoting assembly 251. Any sort of bearing may be used to reduce friction in this pivoting connection. The remaining two beams (255, 258) of pivoting assembly 251 include mounting holes 261 (only one shown). An end 262 of leg 25 has outwardly extending mounting pins 263 (only one shown) that generally cooperate with mounting holes 261 in pivoting assembly 251. Once again, any type of anti-friction bearing may be used, as may different types of pivoting connections. For example, a rod could be mounted in housing 254 and extend from one beam 255 to another 258 through leg 25 to form the pivoting connection. If leg 25 is restricted to pivot about only one axis, then adjacent legs of module 10 should be set up to pivot about axes that are at right angles to one another so as to avoid interference with the other pivoting legs.

As seen in FIG. 1, with specific reference to a leg 28, one end 562 of leg 28 is attached to housing 12 via connecting assembly 500 as discussed above in regards to leg 25. The other end 565 of leg 28 is attached to connecting plate 34. Legs 25-30 may be free standing or may be reinforced by tension cables 566, seen in FIG. 1, as extending from housing 12 to the edge of connecting plate 34 of leg 28. Cables 566 may be reeled in and out as necessary when leg 28 is extended, retracted or pivoted. When utilized, cables 566 give the legs (25-30) a more rigid and stable support. The legs (25-30) themselves may be extended and retracted as desired by the use of extendable housing and motive systems.

Figure 9:
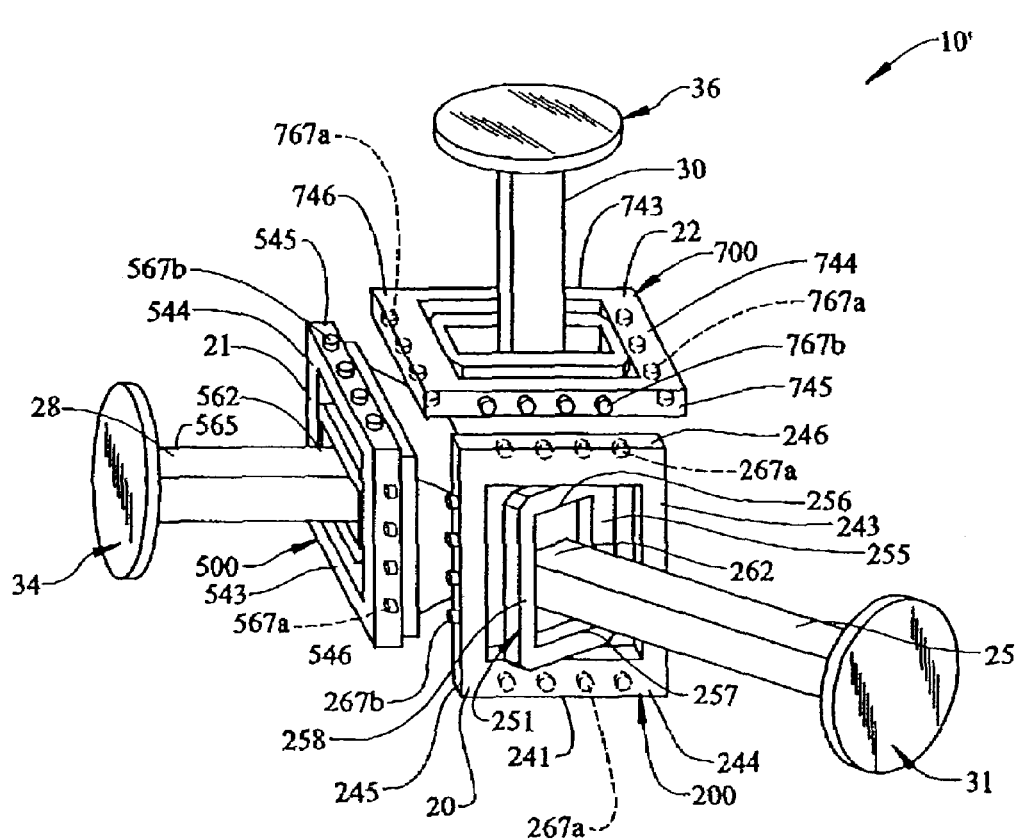
FIG. 9 is an exploded perspective view of three connecting assemblies according to FIG. 1.

Turning now to FIG. 9, the connecting parts of a module 10' are shown. As depicted, leg 25 is pivotally mounted within its associated connecting assembly 200, leg 28 is pivotally mounted within its associated connecting assembly 500 and leg 30 is pivotally mounted within its associated connecting assembly 700. Just as connecting assembly 200 includes beams 243, 244, 245 and 246, so connecting assembly 500 includes beams 543, 544, 545 and 546 and connecting assembly 700 includes beams 743, 744, 745 and 746. A series of holes 267a is formed in each of opposite beams 246 and 244; just as a series of holes 567a is formed in each of opposite beams 544 and 546 and a series of holes 767a is formed in each of opposite beams 744 and 746. Additionally, a series of pins 267b extends from each of respective beams 245 and 243; just as a series of pins 567b extends from each of respective beams 545 and 543, and a series of pins 767b extends from each of respective beams 745 and 743. To connect assemblies 200, 500 and 700, a set of pins 567b are inserted into a set of holes 767a, a set of pins 267b are inserted into a set of holes 567a, and a set of pins 767b are inserted into a set of holes 267a. The remaining pins and holes can be used to attach the remaining connecting assemblies 300, 400, and 600 (not shown in FIG. 9), thereby forming housing 12 depicted in FIG. 1. While the connection shown in FIG. 9 utilizes a series of four holes and a series of four pins, it should be noted that any combination of pins and holes could exist on each beam so long as the mating connector was matched so that each pin lines up with a hole.

Figure 10:
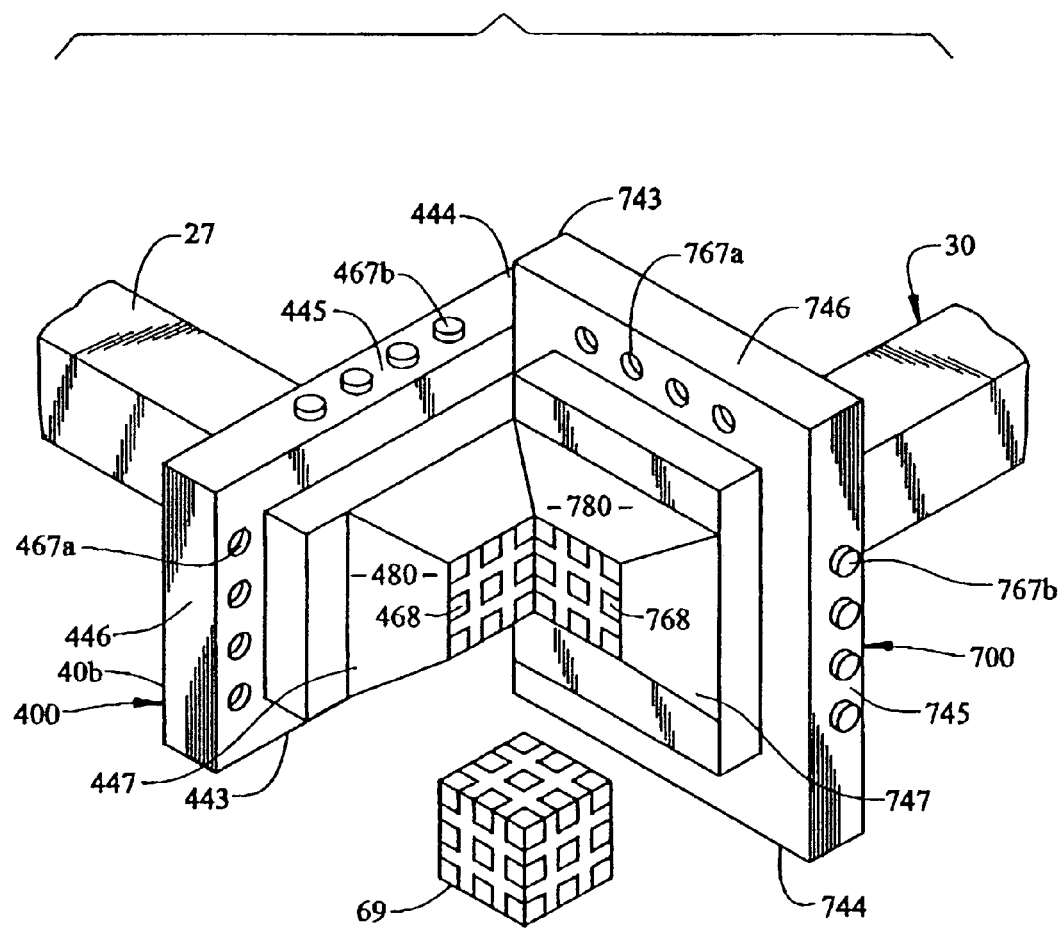
FIG. 10 is a perspective view showing details of two connecting assemblies according to FIG. 1, along with a battery power source.

Each connecting assembly 200, 300, 400, 500, 600, and 700 has an associated back wall 247, 347, 447, 547, 647, and 747. In a preferred embodiment, this back wall is in the form of a truncated pyramid. See FIGS. 8-11. Turning now to FIG. 10, connecting assembly 400 is shown coupled to connecting assembly 700. As previously discussed with respect to connecting assemblies 200, 500 and 700, connecting assembly 400 includes four beam members (443-446) and associated pins (467b) and holes (467a). Further, back wall 447 of assembly 400 includes four angled faces 480 and a top portion or central connector 468. Likewise, back wall 747 of assembly 700 comprises four angled faces 780 and a top portion or central connector 768. As shown, when assembly 700 is coupled to assembly 400, an angled face 480 abuts an angled face 780 such that central connectors 468 and 768 form a right angle with respect to one another. A cubic battery 69 can fit into the right angle formed by central connectors 468 and 768, such that a face of the cubic battery 69 abuts each of central connectors 468 and 768.

Figure 11:
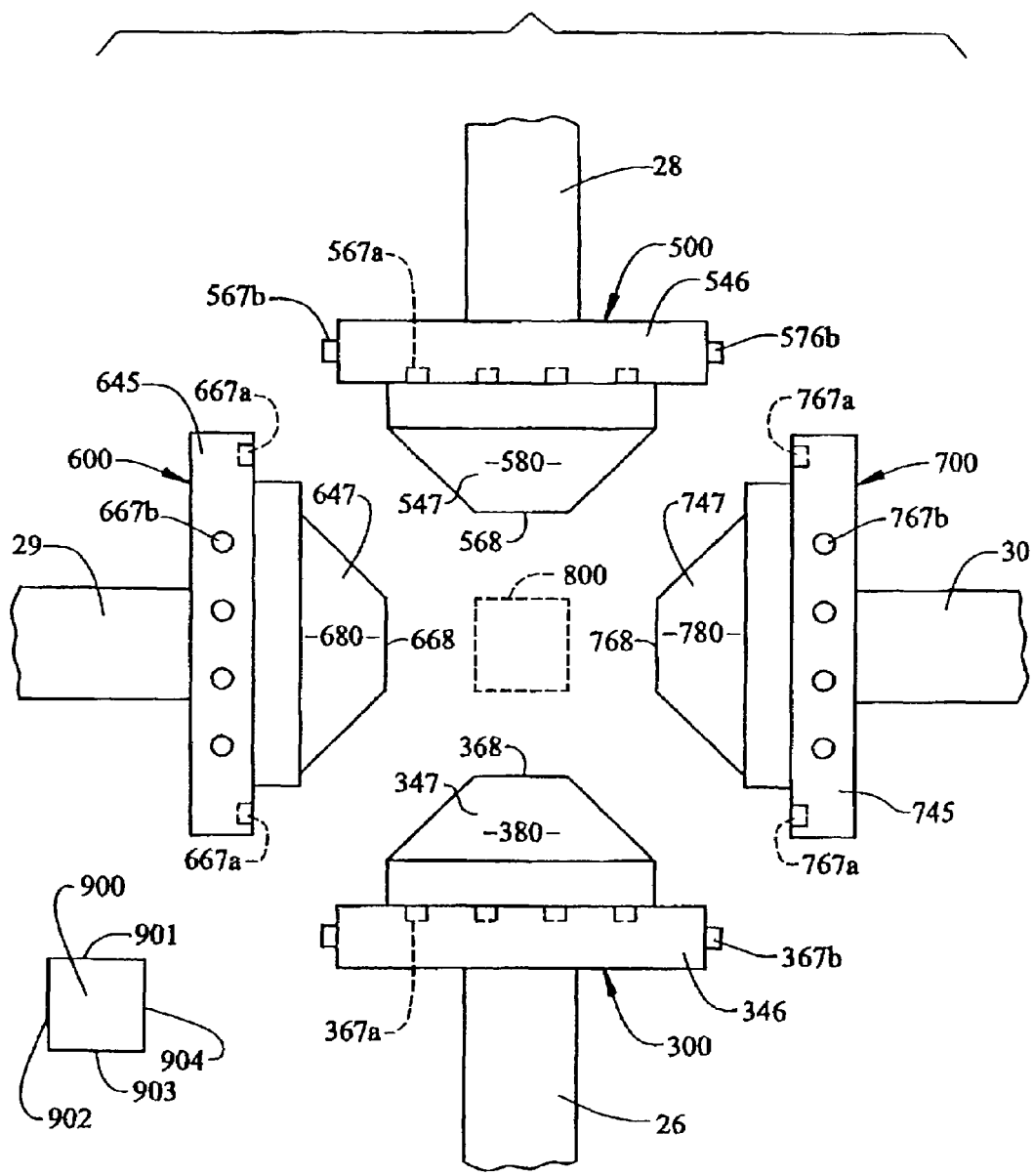
FIG. 11 is an exploded top view of four connecting assemblies according to FIG. 1, along with a battery power source.

Turning now to FIG. 11, four sides or connecting assemblies 300, 500, 600, and 700, of a cubic module 10 are shown. As previously discussed with reference to connecting assemblies 200, 400, 500 and 700, connecting assemblies 300 and 600 each include four beams, of which 346, 546, 645 and 745 are shown. Additionally, it should be noted that connecting assemblies 300, 500 and 600 each include a back wall (347, 547 and 647) with respective angled faces (380, 580, 680).

As should be readily apparent from FIG. 11, when assemblies 300, 500, 600 and 700 are connected, their respective angled faces (380, 580, 680, 780) abut one another, and their respective back walls (347, 547, 647 and 747) form the boundaries of a square opening or battery housing generally indicated at 800 in which a cubic container 900 may be held. Although container 900 can be in the form of an electrical power cell or battery 69, it could also be a reservoir for another type of fuel, or can house electronics, sensors or mechanical devices.

When assemblies 300, 500, 600 and 700 are connected, a side 901 of container 900 abuts central connector 568, a side 902 abuts central connector 668, a side 903 abuts central connector 368 and a side 904 abuts central connector 768. Although not shown, it is understood that when the remaining connecting assemblies 200 and 400 are attached to the connecting assemblies shown in FIG. 11 (300, 500, 600 and 700), the remaining sides of container 900 will abut the central connectors of connecting assemblies 200 and 400.

Battery 69 is the central power source for module 10. While battery 69 is rechargeable, it is also easily replaceable should battery 69 become damaged in any way. The shape of battery 69, along with the manner in which each of connecting assemblies 200, 300, 400, 500, 600 and 700 can communicate with battery 69 when assembled together in housing 12, allows six legs (25-30) and their associated connecting plates (31-36) to be powered by one battery 69. As previously discussed with regards to FIG. 7, wiring 170 is provided so that power source 69 may connect to all six connecting plates (31-36) of a module 10, and thus connect to every other module in a matrix 150. This arrangement allows battery 69 in a module 10 to be recharged through the communication of its associated connecting plates (31-36) with another module in matrix 150 and its associated connecting plates (31-36). This configuration also allows for easy replacement of battery 69.

Figure 12C:
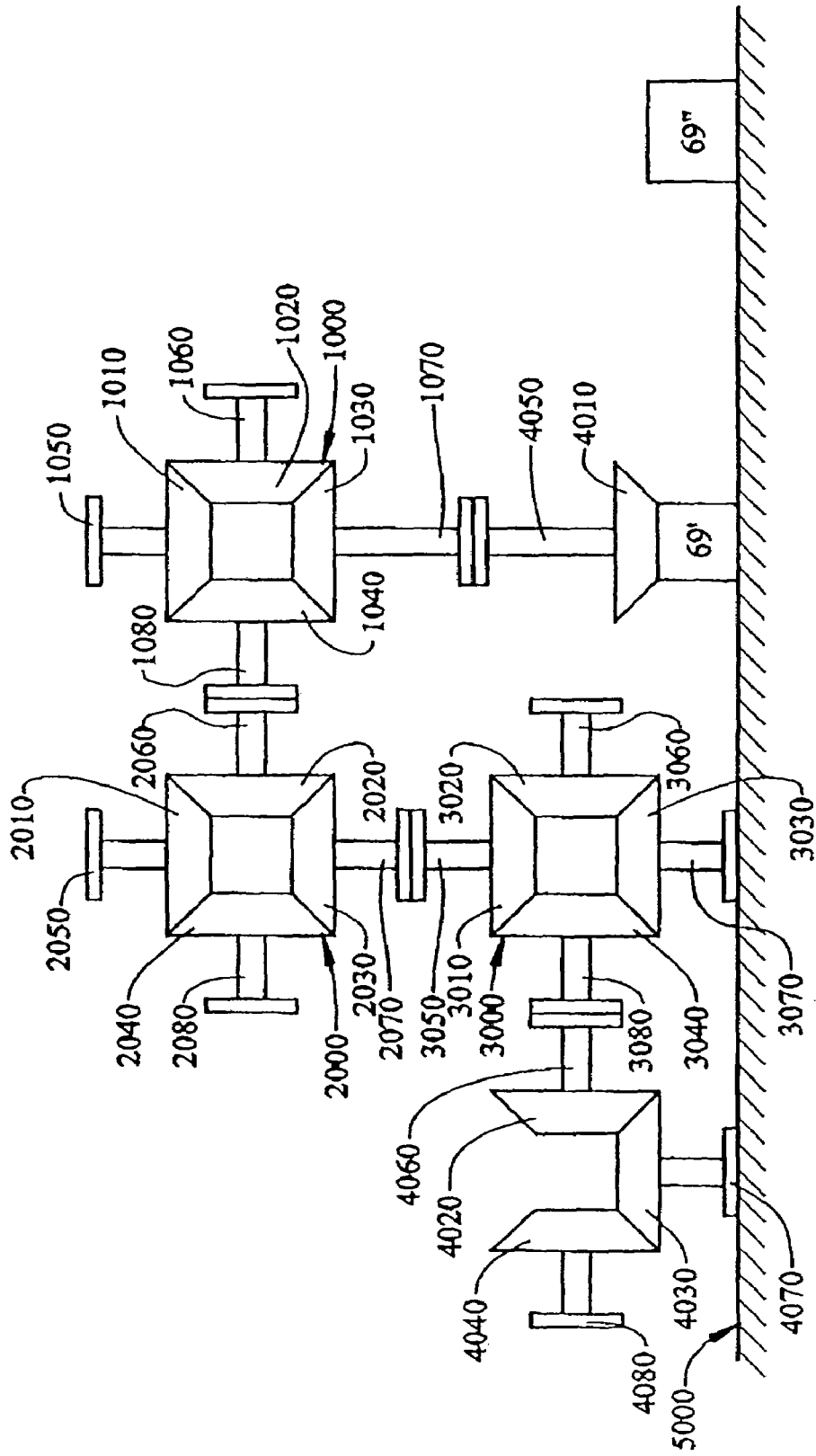

The manner in which a container or battery 69' in a module 10 can be replaced by a new container or battery 69" will now be discussed with reference to FIGS. 12A-12C. A first module 1000 includes first, second, third and fourth connecting assemblies 1010, 1020, 1030, and 1040, and first, second, third and fourth legs 1050, 1060, 1070, and 1080. Likewise, a second module 2000 includes first, second, third and fourth connecting assemblies 2010, 2020, 2030, and 2040 and first, second, third and fourth legs 2050, 2060, 2070, and 2080; a third module 3000 includes first, second, third and fourth connecting assemblies 3010, 3020, 3030, and 3040 and first, second, third and fourth legs 3050, 3060, 3070, and 3080; and a fourth module 4000 includes first, second, third and fourth connecting assemblies 4010, 4020, 4030, and 4040 and first, second, third and fourth legs 4050, 4060, 4070, and 4080. For simplification, the modules in FIGS. 12A-12C are shown as each having four connecting assemblies and four legs. Of course, each of the modules can include six connecting assemblies and six legs, but need only include those connecting assemblies and legs necessary for the particular task to be conducted by the matrix 150'. As depicted in FIG. 12A, the first, second, third and fourth modules 1000, 2000, 3000 and 4000 are detachably coupled to one another to form matrix 150' which is supported by third and fourth modules 3000 and 4000 upon a support surface 5000. A power cell module 69' to be replaced is located in fourth module 4000. Initially, connecting assembly 4010 attaches itself to battery 69', such as through a central connector as previously discussed. Next, as depicted in FIG. 12B, connecting assembly 4010 detaches itself from the remainder of fourth module 4000 (connecting assemblies 4020, 4030 and 4040) and is lifted, via the connection between leg 1070 and leg 4050, away from the remainder of fourth module 4000 by the pivotal movement of legs 1060 and 2080. This movement in turn lifts battery 69' away from the remainder of fourth module 4000. For details of the leg pivoting and extending mechanisms, see the previous discussion of FIG. 8. By extending, retracting, and pivoting legs 1050, 1060, 2050 and 2080, matrix 150' can position the various legs (1050, 1060, 2050 and 2080) such that they can connect and disconnect with one another, thereby "walking" first module 1000 around second module 2000. The result of this movement can be seen in FIG. 12C, where first module 1000 is now positioned to the side of second module 2000 with its leg 1080 connected to leg 2060. In this position, one of legs 1070 or 4050 can be extended, thereby lowering battery 69' to support surface 5000. Next, connecting assembly 4010 can be disconnected from battery 69' and positioned over a new battery 69" via extension of one or both of legs 1080 or 2060. Connecting assembly 4010 can then be lowered until it can attach to battery 69". At this point the previous cycle can be reversed so that connecting assembly 4010 and battery 69" are "walked" back around second module 2000 and battery 69" is lowered into the remainder of fourth module 4000. Once battery 69" is in place, connecting assembly 4010 can reattach itself to the remainder of fourth module 4000. The end result is a matrix 150' having the same configuration as that seen in FIG. 12A, but with a new battery 69" in place of battery 69'. Of course FIGS. 12A-12C only depict one of the many ways a matrix of modules can cooperate to change a battery and are shown only for demonstrative purposes. The scope of the invention should not be seen as limited to the particular steps outlined above.

Although described with reference to preferred embodiments of the invention, it should be readily understood that various changes and/or modifications can be made to the invention without departing from the spirit thereof. In general, the invention is only intended to be limited by the scope of the following claims.

The invention claimed is:

1. A self structuring and computing system comprising:
   a first module including;
   a first connecting assembly having a back wall and a central connector,
   a second connecting assembly having a back wall and a central connector, the second connecting assembly detachably coupled directly to said first connecting assembly,
   a third connecting assembly having a back wall and a central connector, the third connecting assembly detachably coupled directly to said first and second connecting assemblies,
   a housing defined at least in part by the back walls of the first, second and third connecting assemblies;
   a container within the housing having a first, a second, and a third face, each of the central connectors abutting one of the first, second, and third faces of the container, and a computing mechanism.

2. The self structuring and computing system according to claim 1, wherein the container is a power source.

3. The self structuring and computing system according to claim 1, wherein the container is removable.

4. The self structuring and computing system according to claim 1, further comprising;
   a computing mechanism.

5. The self structuring and computing system according to claim 1, further comprising:
   a first set of pins extending from the first connecting assembly;
   a second set of pins extending from the first connecting assembly; a first set of holes formed in the first connecting assembly;
   a second set of holes formed in the first connecting assembly;
   a first set of pins extending from the second connecting assembly;

a second set of pins extending from the second connecting assembly;

a first set of holes formed in the second connecting assembly, the first set of pins extending from the first connecting assembly detachably coupled thereto;

a second set of holes formed in the second connecting assembly;

a first set of pins extending from the third connecting assembly detachably coupled to the first set of holes formed in the first connecting assembly;

a second set of pins extending from the third connecting assembly;

a first set of holes formed in the third connecting assembly, the first set of pins extending from the second connecting assembly detachably coupled thereto; and a second set of holes formed in the third connecting assembly.

6. The self structuring and computing system according to claim 1, further comprising:

a fourth face on the container; and an additional connecting assembly including:

a back wall with a central connector abutting the fourth face of the container, the back wall further defining the housing;

a first set of pins extending from the additional connecting assembly;

a second set of pins extending from the additional connecting assembly;

a first set of holes formed in the additional connecting assembly; and a second set of holes formed in the additional connecting assembly;

whereby one of the first and second sets of pins extending from the additional connecting assembly is detachably coupled to one of the first and second sets of holes formed in one of the first, second and third connecting assemblies, and one of the first and second sets of holes formed in the additional connecting assembly is detachably coupled to one of the first and second sets of pins extending from one of the first, second and third connecting assemblies.

7. The self structuring and computing system according to claim 1, further comprising:

a first leg having a first end and a second end, said first end being pivotally connected to the first connecting assembly;

a second leg having a first end and a second end, said first end being pivotally connected to the second connecting assembly; and a third leg having a first end and a second end, the first end being pivotally connected to the third connecting assembly.

8. The self structuring and computing system according to claim 7, further comprising:

a first connecting plate attached to the second end of said first leg;

a second connecting plate attached to the second end of said second leg;

a third connecting plate attached to the second end of said third leg;

a first communications system adapted to transmit power between the first connecting plate and the container;

a second communications system adapted to transmit power between said second connecting plate and the container;

a third communications system adapted to transmit power between said third connecting plate and the container.

9. The self structuring and computing system of claim 8, further comprising:

a second module including;

a first connecting assembly having a back wall and a central connector, a second connecting assembly having a back wall and a central connector, the second connecting assembly detachably coupled to said first connecting assembly, a third connecting assembly having a back wall and a central connector, the third connecting assembly detachably coupled to said first and second connecting assemblies, a housing defined at least in part by the back walls of the first, second and third connecting assemblies, a container within the housing having a first, a second, and a third face, each of the central connectors abutting one of the first, second, and third faces of the container, a first leg having a first end and a second end, the first end being pivotally connected to the first connecting assembly and the second end having a first connecting plate attached thereto, the first connecting plate detachably coupled to the first connecting plate of the first module, a second leg having a first end and a second end, the first end being pivotally connected to the second connecting assembly and the second end having a second connecting plate attached thereto, a third leg having a first end and a second end, the first end being pivotally connected to the third connecting assembly and the second end having a third connecting plate attached thereto, a first communications system adapted to transmit power between the first connecting plate and the container, and between the first connecting plate and the first connecting plate of the first module, a second communications system adapted to transmit power between said second connecting plate and the container, and a third communications system adapted to transmit power between said third connecting plate and the container.

10. The self structuring and computing system according to claim 1, further comprising:

a fourth connecting assembly having a back wall that further defines the housing and a central connector, the fourth connecting assembly detachably coupled to the first and third connecting assemblies, a fifth connecting assembly having a back wall and a central connector, the fifth connecting assembly detachably connected to the first and second connecting assemblies, a sixth connecting assembly having a back wall and a central connector, the sixth connecting assembly detachably connected to the second, third, fourth and fifth connecting assemblies, and the container further comprising a fourth, a fifth, and a sixth face, each of the fourth, fifth and sixth faces abutting one of the central connectors of the fourth, fifth and sixth connecting assemblies.

11. The module according to claim 10, further comprising:

a fourth leg having a first end and a second end, said first end being pivotally connected to said fourth connecting assembly;

a fifth leg having a first end and a second end, said first end being pivotally connected to said fifth connecting assembly; and a sixth leg having a first end and a second end, said first end being pivotally connected to said sixth connecting assembly.

12. The module according to claim 10, further comprising:

a fourth connecting plate attached to the second end of said fourth leg;

a fifth connecting plate attached to the second end of said fifth leg; and a sixth connecting plate attached to the second end of said sixth leg; whereby each of the first, second, third, fourth, fifth and sixth connecting plates is adapted to attach to another of the first, second third, fourth, fifth, and sixth connecting plates.

* * * * *